UNITED STATES PATENT OFFICE.

OBADIAH RICH, OF CAMBRIDGE, MASSACHUSETTS.

PROCESS OF PREPARING TANNATE OF LIME.

Specification forming part of Letters Patent No. 16,189, dated December 9, 1856.

*To all whom it may concern:*

Be it known that I, OBADIAH RICH, of Cambridge, in the county of Middlesex and State of Massachusetts, have invented a new Mode of Preparing Tannic Acid; and I do hereby declare that the following is a full, clear, and exact description thereof.

My invention has for its object the preparation of tannic acid from the tannate of soda, tannate of potash, or other tannates, and combining it with such substance as will render it fit for transportation in a dry state and suitable for use in the arts of dyeing and tanning, or for other purposes.

Tannic acid may be extracted from oak, hemlock, and other kinds of bark, from nut-galls, waste leather, and other substances, by subjecting them to the action of caustic soda or other caustic alkali until the alkali becomes neutral, as fully set forth in Letters Patent of the United States granted to me on the 2d day of January, 1855. The tannate of soda (or other alkali) in solution is first placed in a suitable cistern or vat. To this I add a sufficient quantity of chloride of calcium to combine with the tannin. By this a double decomposition is effected. Chloride of sodium is formed in solution, while tannate of lime is precipitated. After standing until the precipitate is all deposited at the bottom of the vat the solution of chloride of sodium is drawn off and the tannate of lime is taken out, or the tannate of lime may be separated by filtration. It is now to be well washed and partially dried, then thoroughly dried and pulverized, after which it is in readiness to be packed for transportation and sale.

To use this precipitate a sufficient quantity of water acidulated with sulphuric or oxalic acid is added to it, which combines with the lime to form a sulphate or an oxalate, while the tannin becomes free in solution, and is then ready for the use of tanners or dyers. When used by tanners it should be observed that the action of the solution thus prepared is very rapid upon the gelatine of the skins subjected to it. It is therefore necessary that some extractive matter be used with it, such as bran, sawdust, or spent bark. Thus the tannate of lime may be used for strengthening spent vats. The ground bark may thus be used many times before removal from the vat. If the acid used to decompose the tannate of lime is in excess, it can be neutralized by adding chalk or carbonate of barytes to the solution. Any sulphate of lime in solution can be precipitated with oxalic acid and carbonate of barytes.

What I claim is—

The preparation of the tannate of lime, in the manner set forth, for manufacturing or commercial purposes.

OBADIAH RICH. [L. S.]

In presence of—
J. M. BATCHELDER,
F. L. BATCHELDER.